(12) United States Patent
Ellson et al.

(10) Patent No.: US 6,973,728 B2
(45) Date of Patent: Dec. 13, 2005

(54) FILAMENT TRIMMER WITH DUAL TRIGGERS

(75) Inventors: Bart T. Ellson, Excelsior, MN (US); John O. Hurst, Savage, MN (US); Chadwick A. Shaffer, Oakdale, MN (US)

(73) Assignee: The Toro Company, Bloomington, MN (US)

( * ) Notice: Subject to any disclaimer, the term of this patent is extended or adjusted under 35 U.S.C. 154(b) by 78 days.

(21) Appl. No.: 10/116,738

(22) Filed: Apr. 4, 2002

(65) Prior Publication Data

US 2003/0188435 A1 Oct. 9, 2003

(51) Int. Cl.[7] .............................................. A01D 34/84
(52) U.S. Cl. ............................ 30/276; 56/12.7; 172/14
(58) Field of Search ........................ 30/276, 347, 340; 56/12.7; 172/14

(56) References Cited

U.S. PATENT DOCUMENTS 6,439,088 B1 * 8/2002 Eytchison et al. ........ 30/276 X

2003/0037933 A1 * 2/2003 Breneman et al. ............ 172/14

OTHER PUBLICATIONS

Toro Electric Trimmers Brochure dated 2001.
Photograph (undated) showing Craftsman Cordless Trimmer.

* cited by examiner

Primary Examiner—Douglas D Watts
(74) Attorney, Agent, or Firm—James W. Miller

(57) ABSTRACT

A filament trimmer includes a rotatable trimmer head having an outwardly extending filament. The trimmer has an upper handle that the operator can grip to operate the trimmer in either a trim mode or an edge mode. In the trim mode, the filament extending outwardly from the trimmer head is positioned in a generally horizontal cutting plane, while in the edge mode the trimmer is reoriented such that the filament is positioned in a generally vertical cutting plane. The upper handle of the trimmer includes dual triggers for selectively starting and stopping rotation of the trimmer head. One trigger is actuated when the trimmer is operated in the trim mode and the other trigger is actuated when the trimmer is operated in the edge mode.

20 Claims, 9 Drawing Sheets

US 6,973,728 B2

FILAMENT TRIMMER WITH DUAL TRIGGERS

TECHNICAL FIELD

This invention relates to a filament trimmer having an outwardly extending filament that cuts grass or other ground growing vegetation when the filament is rotated in a cutting plane. More particularly, this invention relates to a filament trimmer that is operable in both a trim mode in which the filament rotates in a generally horizontal cutting plane and in an edge mode in which the filament rotates in a generally vertical cutting plane.

BACKGROUND OF THE INVENTION

Filament trimmers are well known lawn and garden implements. Such a trimmer includes a rotatable trimmer head that has an outwardly extending flexible filament. When the trimmer head is rotated by a drive contained on the trimmer, the filament is spun in a cutting plane to be able to sever grass or other ground growing vegetation. The drive for rotating the trimmer head may be an electrical motor operated by an electrical power source, e.g. a battery on the trimmer or an electric power cord. The drive may also be a drive shaft operated by an internal combustion engine carried on the trimmer.

Some filament trimmers are specifically designed for use in both a trim mode and an edge mode. In the trim mode, the trimmer head is placed generally parallel to the ground such that the filament is rotated in a generally horizontal cutting plane to trim grass or weeds at a height above the ground depending on how close the trimmer head is positioned adjacent the ground. In the edge mode, the trimmer is reoriented from its orientation in the trim mode. In the edge mode, the trimmer head is generally perpendicular to the ground such that the filament is rotated in a generally vertical cutting plane to edge grass along a sidewalk or the like, i.e. to cut off the grass at ground level along the edge of the sidewalk.

In prior trimmers designed with both trim and edge modes, the upper handle of the trimmer contains a single trigger for starting and stopping rotation of the trimmer head. In addition, the upper handle of the trimmer pivots to selectively reposition the upper handle when using the trimmer in both the trim and edge modes. This repositioning is done by providing the upper handle with two different operating positions and by pivoting the handle from one operating position to the other operating position to use the trimmer in one mode of operation or the other. However, some operators do not intuitively understand how to pivot the handle and thus find it difficult to initially figure out how to reposition the upper handle to use the trimmer in both the trim and edge modes of operation. In addition, the need to stop the trimmer and manually reposition the upper handle is inconvenient and thus discourages some operators from switching between the two available modes of operation.

SUMMARY OF THE INVENTION

This invention relates to a filament trimmer having dual triggers on the handle with one trigger being used in the trim mode and one trigger in the edge mode. This allows use of the trimmer in both modes without requiring a handle that must be repositioned relative to the rest of the trimmer to operate in both modes.

One aspect of this invention relates to a filament trimmer that comprises a rotatable trimmer head having an outwardly extending filament. An upper handle is provided which the operator can grip to position the trimmer head adjacent the ground and to operate the trimmer in either a trim mode or an edge mode. The filament is positioned in a generally horizontal cutting plane in the trim mode and in a generally vertical cutting plane in the edge mode. Dual triggers are provided on the upper handle for selectively starting and stopping rotation of the trimmer head. One trigger is actuated to operate the trimmer in the trim mode and the other trigger is actuated to operate the trimmer in the edge mode.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

Figure 1:
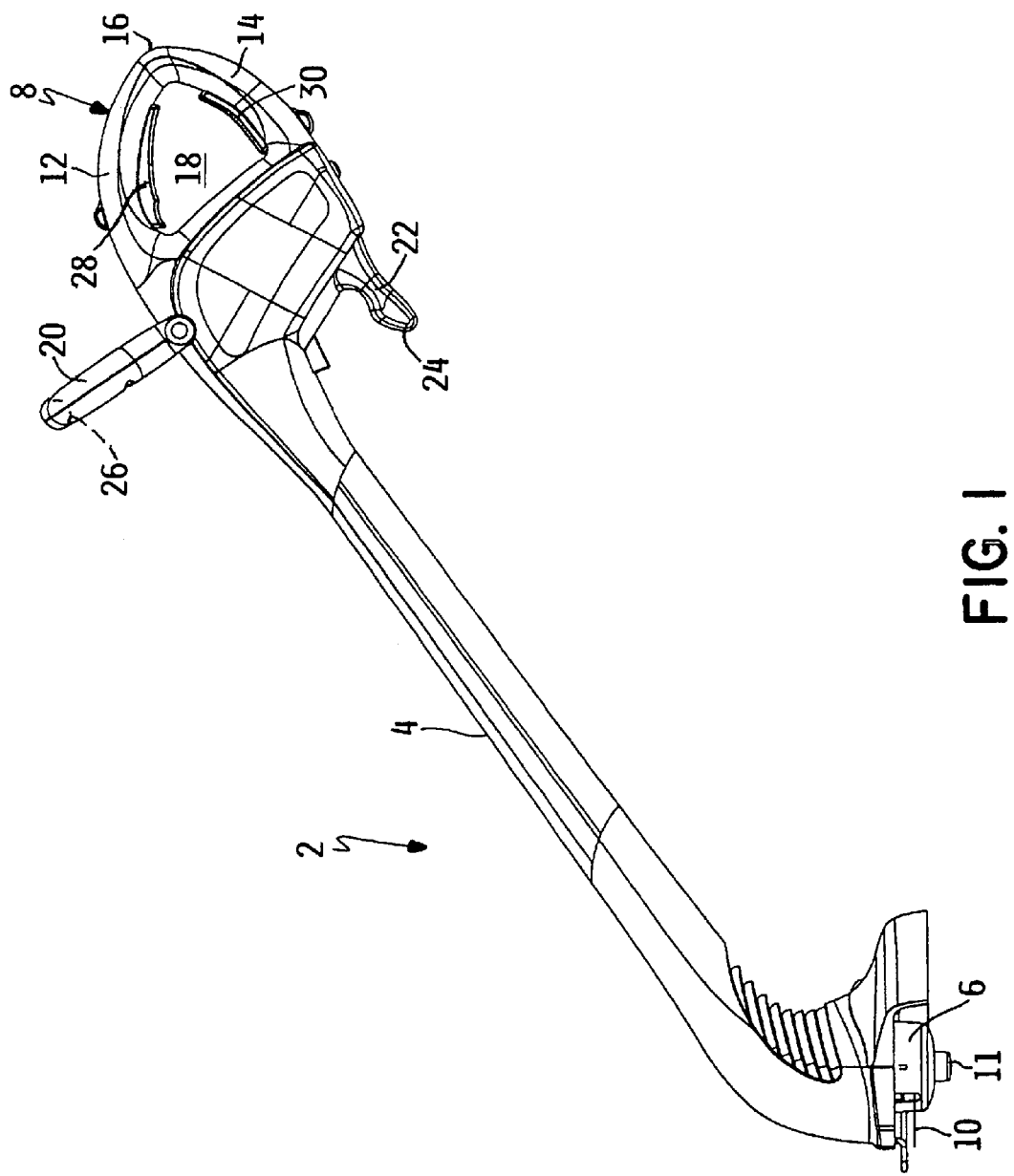
FIG. 1 is a side elevational view of a first embodiment of a filament trimmer according to this invention, particularly illustrating the trimmer positioned in the trim mode.

A first embodiment of a filament trimmer 2 according to this invention is illustrated in FIGS. 1–4.

Trimmer 2 includes a housing 4 carrying a rotatable trimmer head 6 at the lower end of housing 4. Housing 4 includes a handle 8 at the upper end of housing 4 to allow the operator to grip and hold trimmer 2. A drive comprising an electric drive motor (not shown) is provided in housing 4 for rotating trimmer head 6. A rechargeable battery (not shown) is located in housing 4 and is electrically coupled to the motor for powering the motor. When the motor is powered and trimmer head 6 is rotated, a flexible filament 10 extending outwardly from trimmer head 6 is spun in a cutting plane to sever grass or other ground growing vegetation.

Trimmer head 6 preferably includes a filament feed system that replenishes the flexible filament when filament 10 is shortened due to use. Trimmer head 6 comprises a ground bump head having a ground bump button 11. This allows the operator to selectively actuate the filament feed system by bumping ground bump button 11 against the ground to feed out new filament in a filament replenishment operation. The structural and operational details of ground bump heads are well known in the filament trimmer art and need not be further described herein. U.S. Pat. No. 6,279,235, assigned to the assignee of this invention, discloses one such ground bump head and is hereby incorporated by reference.

Alternatively, trimmer head 6 could use a filament feed system that operates automatically without conscious operator action, such as an automatic feed trimmer head that is responsive to centrifugal force and how centrifugal force changes as the filament shortens to automatically feed out additional filament when the filament shortens more than is desired. Additionally, trimmer head 6 could comprise a manual feed trimmer head in which the trimmer is stopped, the filament feed system in the trimmer head is unlocked, and the operator then manually pulls out additional filament from the trimmer head. Finally, trimmer head 6 could even be provided with no filament feed system at all, such as a trimmer head using at least one piece of a fixed length filament that when shortened is simply replaced with a new piece of fixed length filament. Thus, the nature of the filament feed system, and even the presence of a filament feed system, is not important to this invention.

Handle 8 comprises a first front hand grip 12 and a second rear hand grip 14 joined together at an apex 16. Apex 16 could be deleted if so desired such that a small gap would be provided between front and rear hand grips 12 and 14 where apex 16 had been located. Front and rear hand grips 12 and 14 are preferably angled relative to one another. Each front and rear hand grip 12 and 14 is gently curved, but could also be more or less straight if so desired. Handle 8 includes an enclosed hand grip space 18 lying beneath front and rear hand grips 12 and 14.

Housing 4 of trimmer 2 also includes a pair of cantilevered, assist handles attached thereto, namely a front assist handle 20 and a rear assist handle 22. Front assist handle 20 is a loop type handle bolted to housing 4 with the loop type handle having an upper transverse cross member 26 that the operator can grip. Rear assist handle 22 is molded to housing 4 and is wide enough so that the operator can rest the palm of one hand on rear assist handle 22 and grip the lower end 24 of rear assist handle 22 by curling the fingers of that hand around the free lower end 24 of rear assist handle 22.

Dual triggers are provided on handle 8 to allow the operator to selectively actuate trimmer head 6. A front trigger 28 is located on front hand grip 12 of handle 8. A rear trigger 30 is located on rear hand grip 14 of handle 8. Triggers 28 and 30 actuate an electrical switch 32 that controls the application of electrical power to the motor that rotates trimmer head 6.

Each trigger 28 and 30 includes a relatively long lower portion 34 that sticks out through the underside of the corresponding hand grip 12 or 14 and a relatively short upper portion 36 that sticks out through the top of the corresponding hand grip 12 or 14. The operator can actuate each trigger by squeezing lower portion 34 of the trigger closed against the underside of the hand grip using the operator's fingers, as depicted by the arrows A in FIG. 3.

Figure 3:
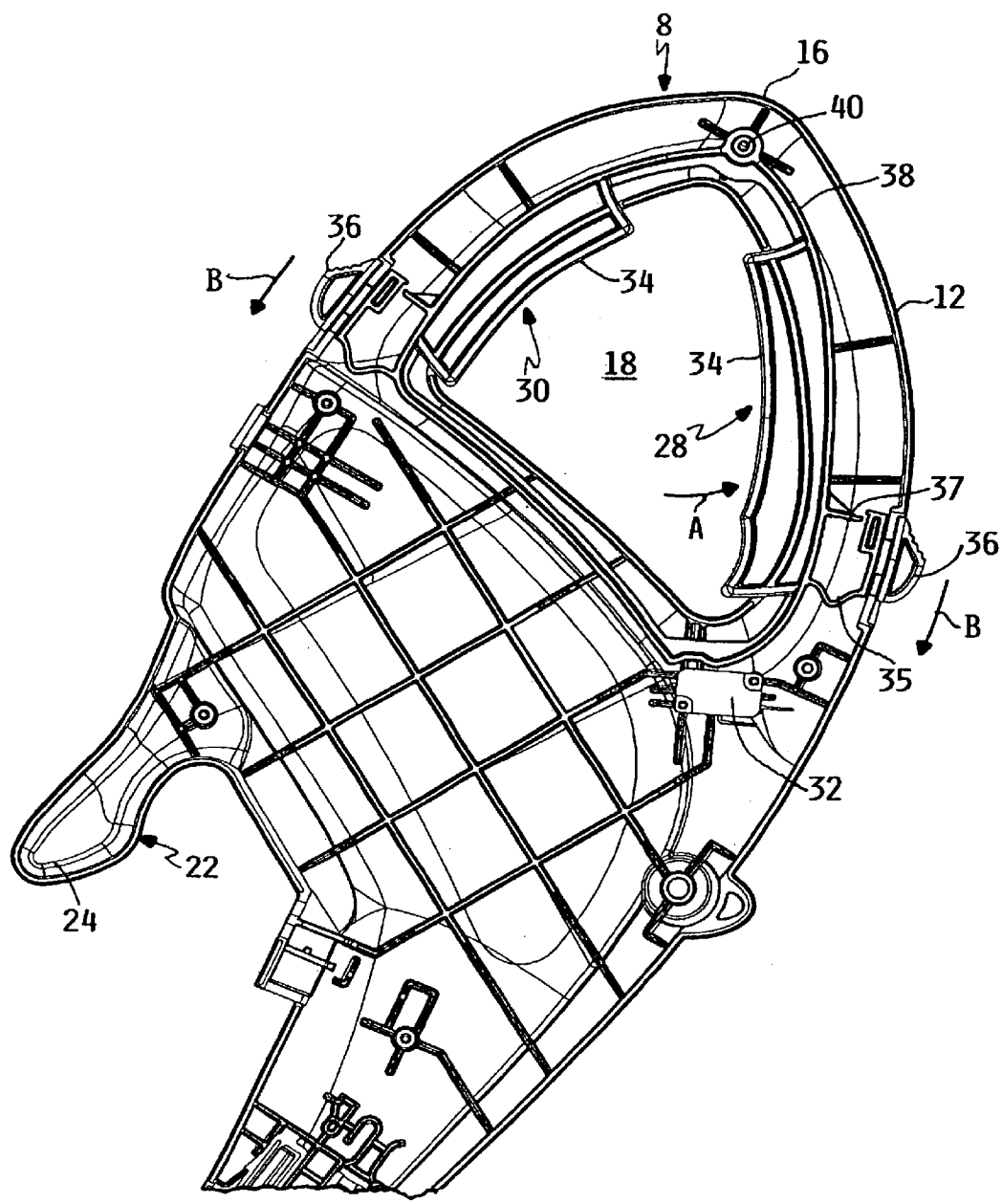
FIG. 3 is an enlarged side elevational view of the upper handle of the filament trimmer shown in FIG. 1, with a portion of the upper handle removed to illustrate the dual triggers and their interaction with an electrical push button switch for actuating the trimmer head but with both of the triggers being shown in a non-actuated state with the switch in its off state.

However, lower portion 34 of the trigger can be squeezed closed only if the operator first pushes down on upper portion 36 of the trigger with the operator's thumb in a slide type action, as depicted by the arrows B in FIG. 3, to flex a flexible portion 35 of the trigger. The flexing action of flexible portion 35 is sufficient to move the underside of upper portion 36 of the trigger out of the way of a rib 37 on lower portion 34, thereby allowing lower portion 34 to be squeezed up against the underside of the corresponding hand grip. If the operator does not first push down on upper portion 36 with his thumb as illustrated by the arrows B in FIG. 3, rib 37 on lower portion 34 will engage against the underside of upper portion 36 to stop movement of lower portion 34 short of the point at which switch 32 is actuated. Thus, upper portion 36 of each trigger 28 and 30 requires a two step process to obtain actuation of trimmer head 6, i.e. upper portion 36 must first be slid down and then lower portion 34 must be squeezed closed.

Figure 4:
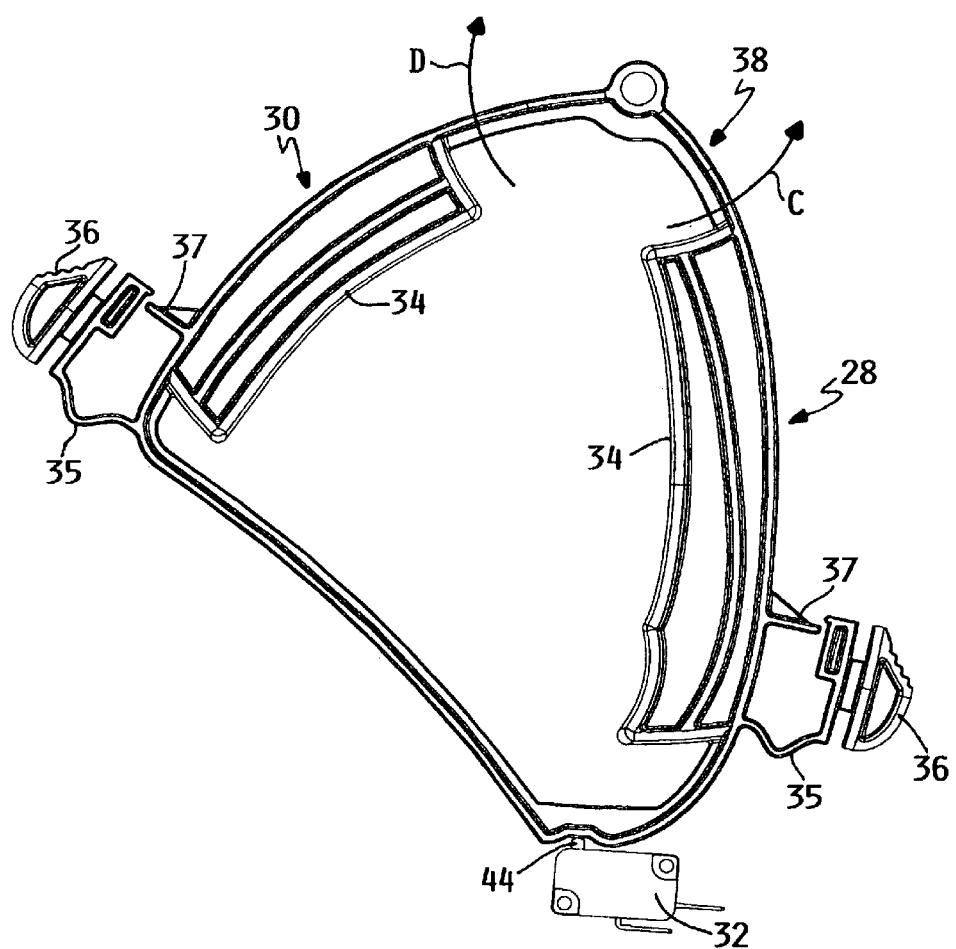
FIG. 4 is an enlarged side elevational view similar to FIG. 3, but showing only the dual triggers and the switch disposed in the same states as depicted in FIG. 3.

Referring more particularly to FIGS. 3 and 4, front and rear triggers 28 and 30 are actually part of a single, integrated rocker type trigger assembly 38 such that front and rear triggers 28 and 30 move conjointly with one another. As shown in FIG. 3, trigger assembly 38 pivots about a pivot pin 40 located at apex 16 of handle 8. Trigger assembly 38 pivots in opposite directions about pivot pin 40, as depicted by the arrows C and D in FIG. 4, depending upon whether front trigger 28 or rear trigger 30, respectively, is actuated. Trigger assembly 38 includes a notch 42 in which an actuating button 44 of a push button electrical switch 32 is received. Movement of trigger assembly 38 in either direction about pivot pin 40 causes notch 42 to push in on actuating button 44 of switch 32 to change the state of switch 32 from an off state to an on state and cause trimmer head 6 to start rotating.

Actuating button 44 of electrical switch 32 is normally biased by a spring inside switch 32 to move outwardly to place switch 32 into the off state of switch 32. Notch 42 on trigger assembly 38 pushes in on actuating button 44 only by overcoming the spring force normally biasing actuating button 44 outwardly. Thus, when the operator releases whatever trigger was used to actuate trimmer head 6, the spring force on actuating button 44 will act to push actuating button 44 back out, thus acting on notch 42 on trigger assembly 38 to move trigger assembly 38 back to a neutral condition in which electrical switch 32 is normally disposed in its off state. Thus, when neither trigger 28 or 30 has been actuated, electrical switch 32 is in the off state such that no electrical power is supplied to the motor and trimmer head 6 is not rotating.

The orientation of trimmer 2 in a trim mode is shown in FIG. 1. In the trim mode, the operator stands behind housing 4 and grips front hand grip 12 of handle 8 with one hand with the palm of the operator's hand resting on top of front hand grip 12 and with the fingers of the operator's hand curling around front hand grip 12 with the fingers being received in hand grip space 18 gripping against the underside of front hand grip 12. The operator can then grip cross member 26 of front assist handle 20 with the operator's other hand. When holding trimmer 2 thusly, namely with one hand placed on front hand grip 12 and the other hand placed on front assist handle 20, the operator is able to position trimmer 2 in the customary trim mode shown in FIG. 1, where filament 10 extending from trimmer head 6 spins in a generally horizontal plane to trim or sever grass or other ground growing vegetation. To actuate trimmer head 6 in the trim mode, the operator need only actuate front trigger 28 by squeezing lower portion 34 of the trigger closed against the underside of front hand grip 12 after first pushing or sliding upper portion 36 of the trigger downwardly along the top of front hand grip 12.

Figure 2:
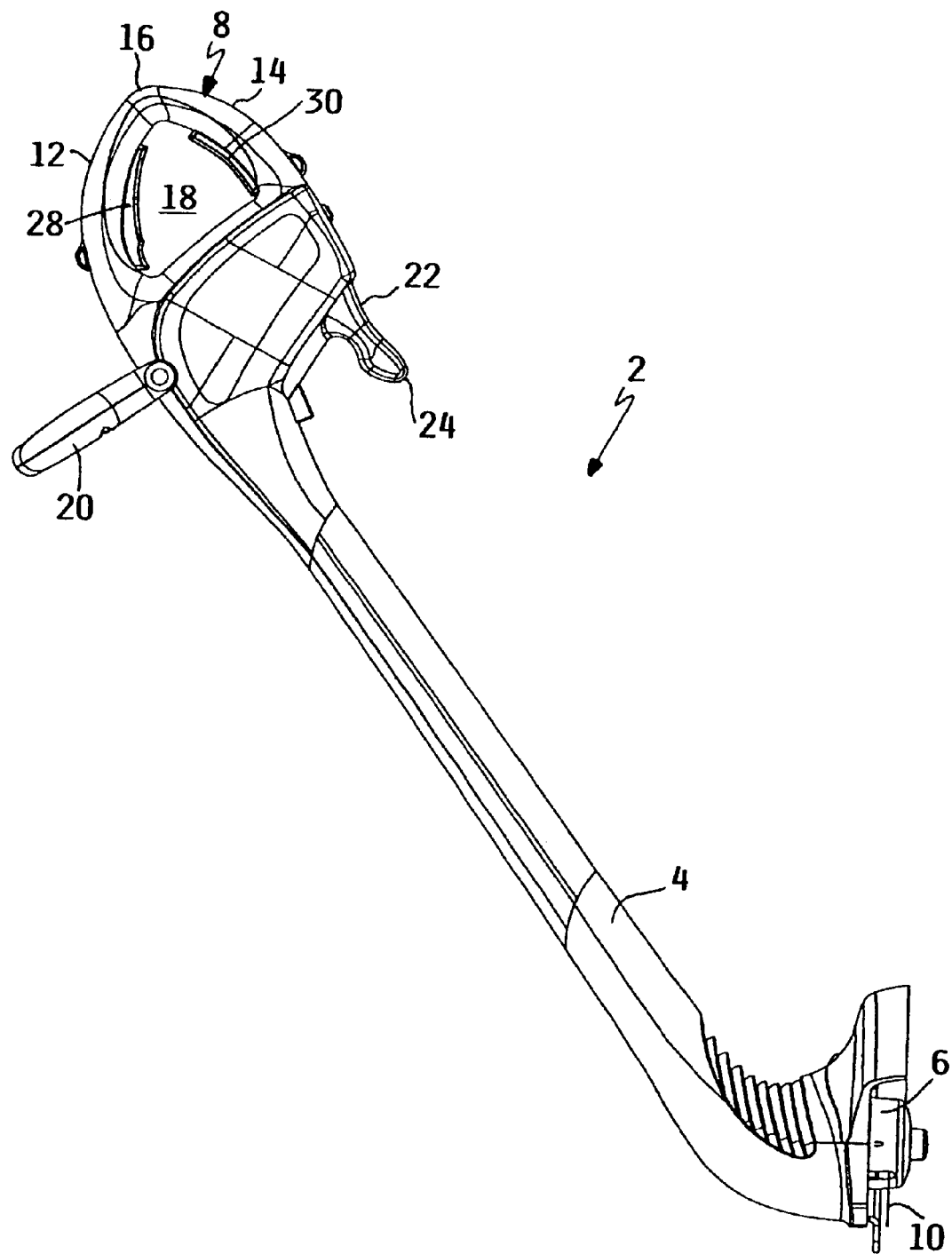
FIG. 2 is a side elevational view of the filament trimmer shown in FIG. 1, particularly illustrating the trimmer positioned in the edge mode.

The orientation of trimmer 2 in an edge mode is shown in FIG. 2. The edge mode is one used for edging grass or other vegetation along the edge of a sidewalk or the like. To use trimmer 2 in the edge mode, trimmer 2 is flipped over and reoriented as is clear by comparing FIGS. 1 and 2. In the edge mode, filament 10 extending from trimmer head 6 spins in a generally vertical plane like the cutting blade of a conventional lawn edger.

In the edge mode, the operator now stands in front of housing 4 and grips rear hand grip 14 of handle 8 with one hand with the palm of the operator's hand resting on top of rear hand grip 14 and with the fingers of the operator's hand curling around rear hand grip 14 with the fingers being received in hand grip space 18 gripping against the underside of rear hand grip 14. The operator can then grip lower end 24 of rear assist handle 22 with the operator's other hand. When holding trimmer 2 thusly, namely with one hand placed on rear hand grip 14 and the other hand placed on rear assist handle 22, the operator is able to conveniently position and hold trimmer 2 in the customary edge mode shown in FIG. 2. To actuate trimmer head 6 in the edge mode, the operator need only actuate rear trigger 30 by squeezing lower portion 34 of the trigger closed against the underside of rear hand grip 14 after first pushing or sliding upper portion 36 of the trigger downwardly along the top of rear hand grip 14.

Trimmer 2 of this invention can be used in either the trim or edge modes simply by flipping trimmer 2 over and reorienting it. This is intuitive to do, particularly since the presence of the dual triggers 28 and 30 helps guide the operator in how to place the operator's hands and in how trimmer 2 should be reoriented for the different trim and edge modes. Handle 8 does not have to be pivoted into different operational positions relative to the rest of trimmer 2 as in some prior art trimmers. The dual triggers 28 and 30 allow trimmer head 6 to be comfortably actuated by the operator in either mode of trimmer 2 using the appropriate trigger.

A second embodiment of a filament trimmer 2' according to this invention is illustrated in FIGS. 5–12. Since the second embodiment of trimmer 2' has many common features to that of the first embodiment, the same reference numerals applied to components of trimmer 2 of the first embodiment will be used to refer to the corresponding components of trimmer 2' of the second embodiment except that such identical reference numerals used in conjunction with trimmer 2' of the second embodiment will carry a prime suffix, e.g. trimmer 2' instead of trimmer 2. Only the major points of difference between trimmers 2 and 2' will be specifically described hereafter, the structure and operation of the two trimmers 2 and 2' otherwise being identical for which a separate description would be redundant and unnecessary.

Trimmer 2' of the second embodiment is not battery operated, but instead carries an electrical socket (not shown) into which one end of an electrical extension cord (not shown) could be plugged. An enclosed hand grip space 18' includes a cord lock 50 for such extension cord. Cord lock 50 is preferably of the type disclosed in U.S. Pat. No. 5,644,844 to Pink, assigned to the assignee of this invention, which patent is incorporated by reference.

Front and rear assist handles 20' and 22' in trimmer 2' are now carried on a common hub 52 that is coupled to on an intermediate connecting tube 54 of housing 4' of trimmer 2'. Front and rear assist handles 20' and 22' both include transverse cross members 26' and 56, respectively, that can be gripped by the operator. Front assist handle 20' may be a loop type handle in which cross member 26' is located at the top of the loop. Rear assist handle 22' may be an L-shaped handle in which cross member 56 is a transversely extending, horizontal leg of the L-shape.

Trimmer 2' includes front and rear triggers 28' and 30' that are no longer part of a common integrated trigger assembly 38. Front and rear triggers 28' and 30' are now pivotally mounted to handle 8' on separate pivot pins. Front trigger 28' is pivotally mounted to front hand grip 12' by a front pivot pin 58, and rear trigger 30' is pivotally mounted to rear hand grip 14' by a rear pivot pin 60. Front and rear triggers 28' and 30' each have a lower portion 34' that sticks out through the underside of the corresponding hand grip, but front and rear triggers 28' and 30' no longer have an upper portion that sticks out through the top of the corresponding hand grip.

A single electrical switch 32' is provided within housing 4' for operating the electrical motor that powers trimmer head 6'. Switch 32' is now a slide switch having an actuating button 44' that slides back and forth in opposed directions as shown by the arrows E and F in FIG. 7. Actuating button 44' is normally spring biased in the direction of arrow E by a spring (not shown) inside the housing of switch 32'. The lower end of front trigger 28' is provided with an actuating finger 62 that engages the side of actuating button 44' that is opposite to the direction of the spring biasing force so that actuating finger 62 can push on actuating button 44' and cause actuating button 44' to slide against the spring biasing force. Thus, when the spring biasing force moves actuating button 44' in the direction of arrow E, actuating finger 62 of front trigger 28' is arranged to push on actuating button 44' in the opposite direction represented by arrow F.

Figure 9:
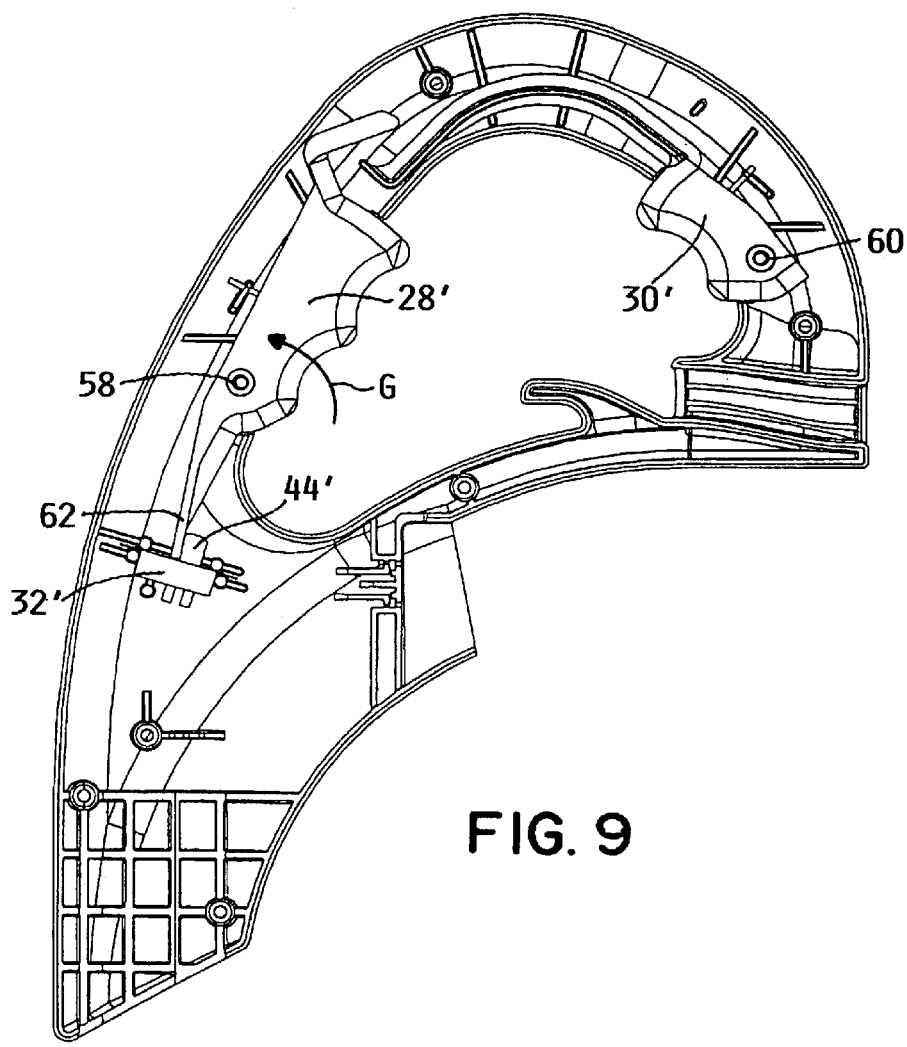
FIG. 9 is an enlarged side elevational view of the upper handle of the filament trimmer shown in FIG. 5, with a portion of the upper handle removed to illustrate the dual triggers and their interaction with an electrical slide switch for actuating the trimmer head but with the front trigger being shown in an actuated state with the switch in its on state to rotate the trimmer head in the trim mode of FIG. 5.
Figure 10:
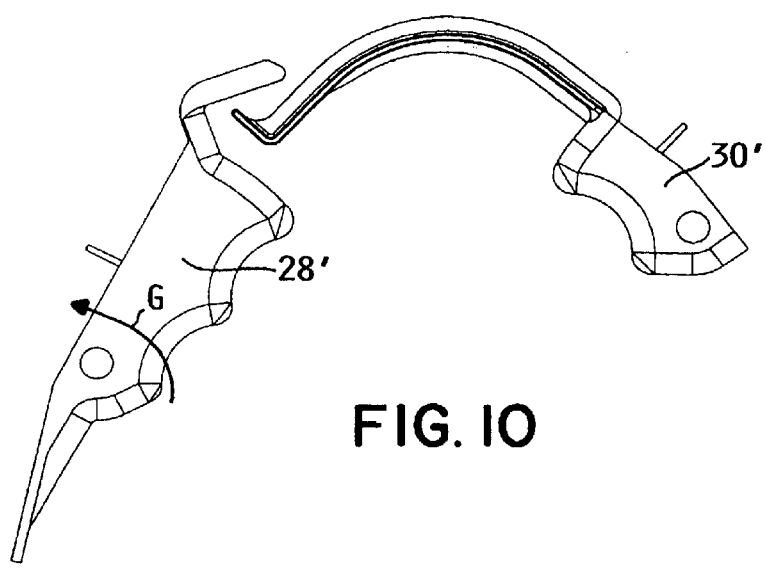
FIG. 10 is an enlarged side elevational view similar to FIG. 9, but showing only the dual triggers and the switch disposed in the same states as depicted in FIG. 9.
Figure 11:
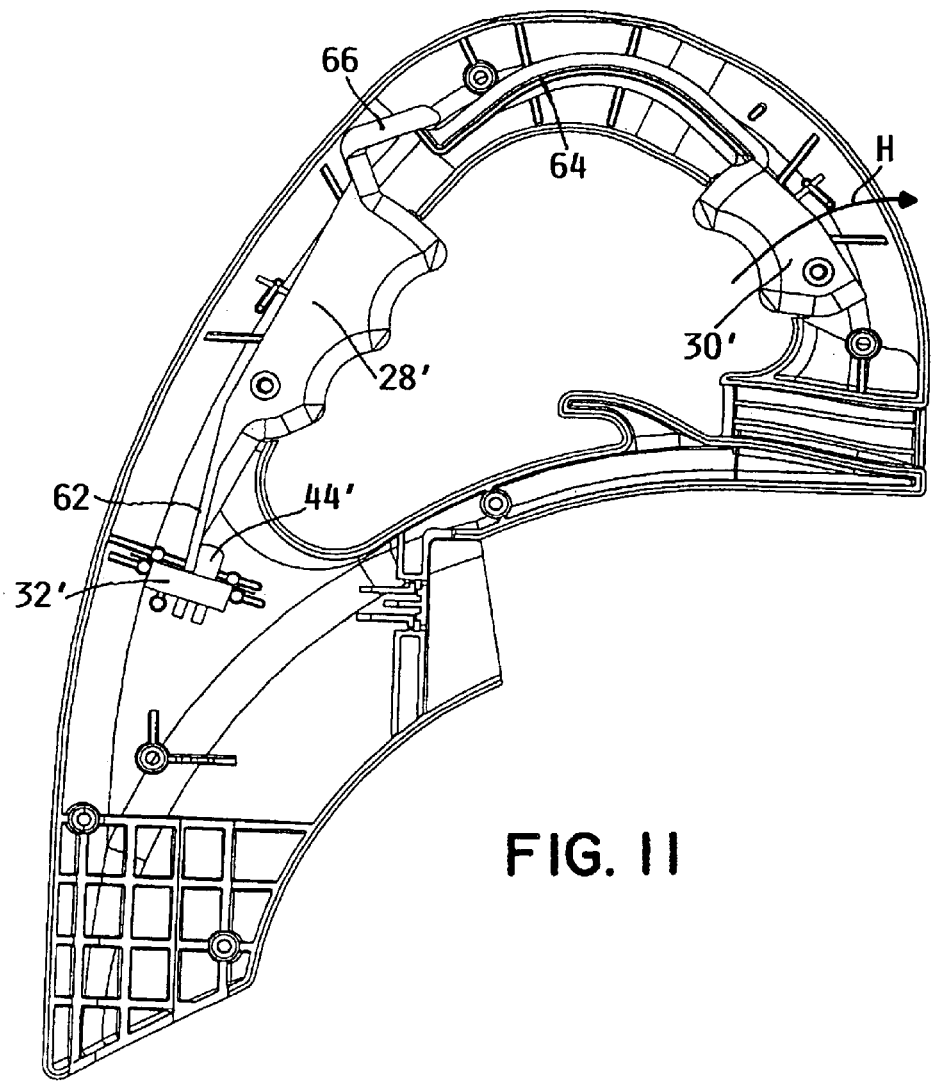
FIG. 11 is an enlarged side elevational view of the upper handle of the filament trimmer shown in FIG. 5, with a portion of the upper handle removed to illustrate the dual triggers and their interaction with an electrical slide switch for actuating the trimmer head but with the rear trigger being shown in an actuated state with the switch in its on state to rotate the trimmer head in the edge mode of FIG. 6.
Figure 12:
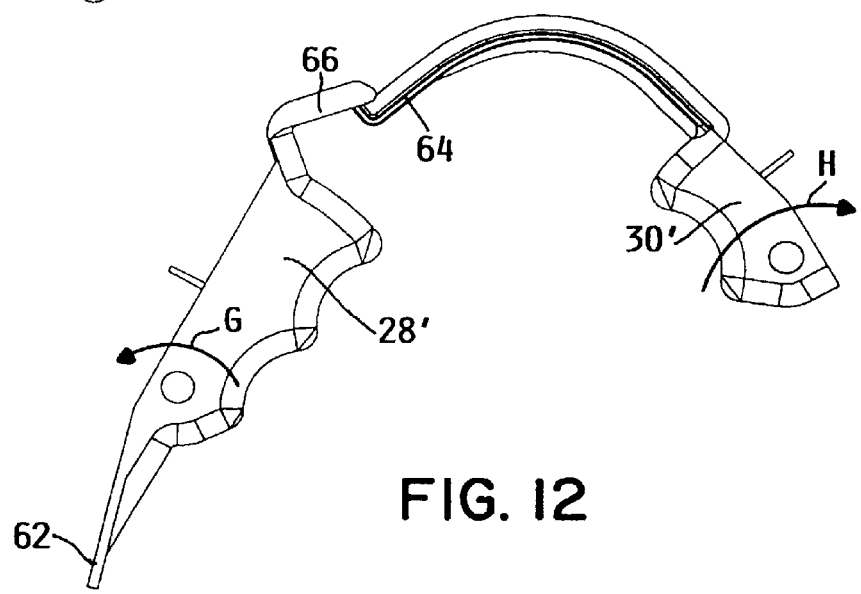
FIG. 12 is an enlarged side elevational view similar to FIG. 11, but showing only the dual triggers and the switch disposed in the same states as depicted in FIG. 11.

When the operator actuates front trigger 28' by gripping front hand grip 12' and by squeezing front trigger 28' closed against the underside of front hand grip 12', as shown in FIG. 9, front trigger 28' is rotated about front pivot pin 58 in the direction of arrow G in FIGS. 9 and 10. This rotary motion of front trigger 28' causes actuating finger 62 to push against actuating button 44' and slide actuating button 44' in the direction of arrow F, against the spring biasing force tending to push actuating button 44' in the direction of arrow E, to actuate switch 32' by changing the state of switch 32' from the off state to the on state. In turn, this applies electrical power to the motor to begin operation of trimmer head 6'. Front trigger 28' will be actuated in this manner, while the operator grabs front hand grip 12' and front assist handle 20', to operate trimmer 2' in the trim mode thereof.

When the operator wishes to stop the operation of trimmer 2' in the trim mode, front trigger 28' is simply released. The spring force tending to slide actuating button 44' in the direction of the arrow E then pushes against actuating finger 62 of front trigger 28' until the trigger moves back to its neutral position, shown in FIGS. 7 and 8. In this neutral position of the trigger, electrical switch 32' is in the off state and trimmer head 6' is not rotating.

Figure 5:
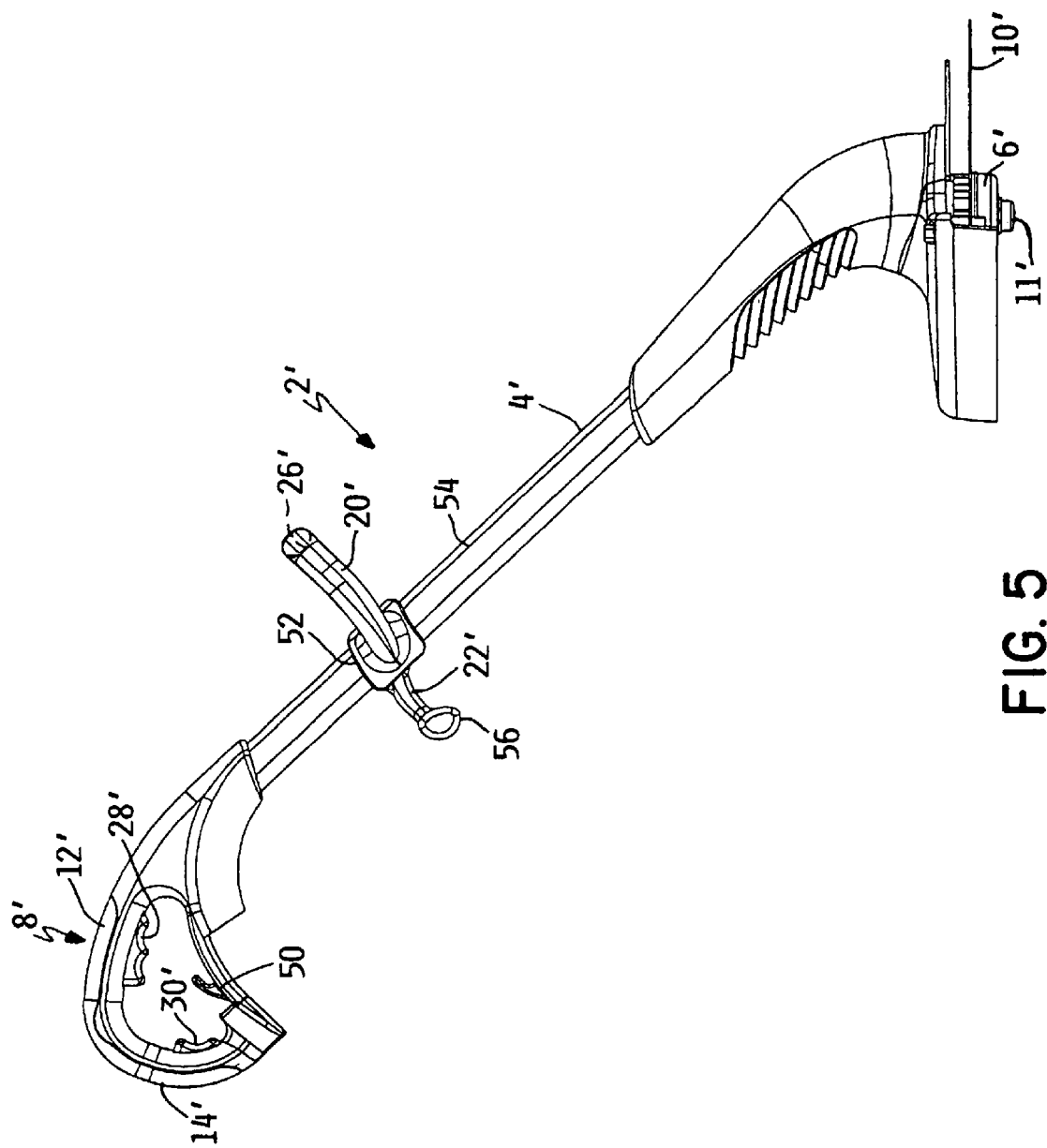
FIG. 5 is a side elevational view of a second embodiment of a filament trimmer according to this invention, particularly illustrating the trimmer positioned in the trim mode.
Figure 6:
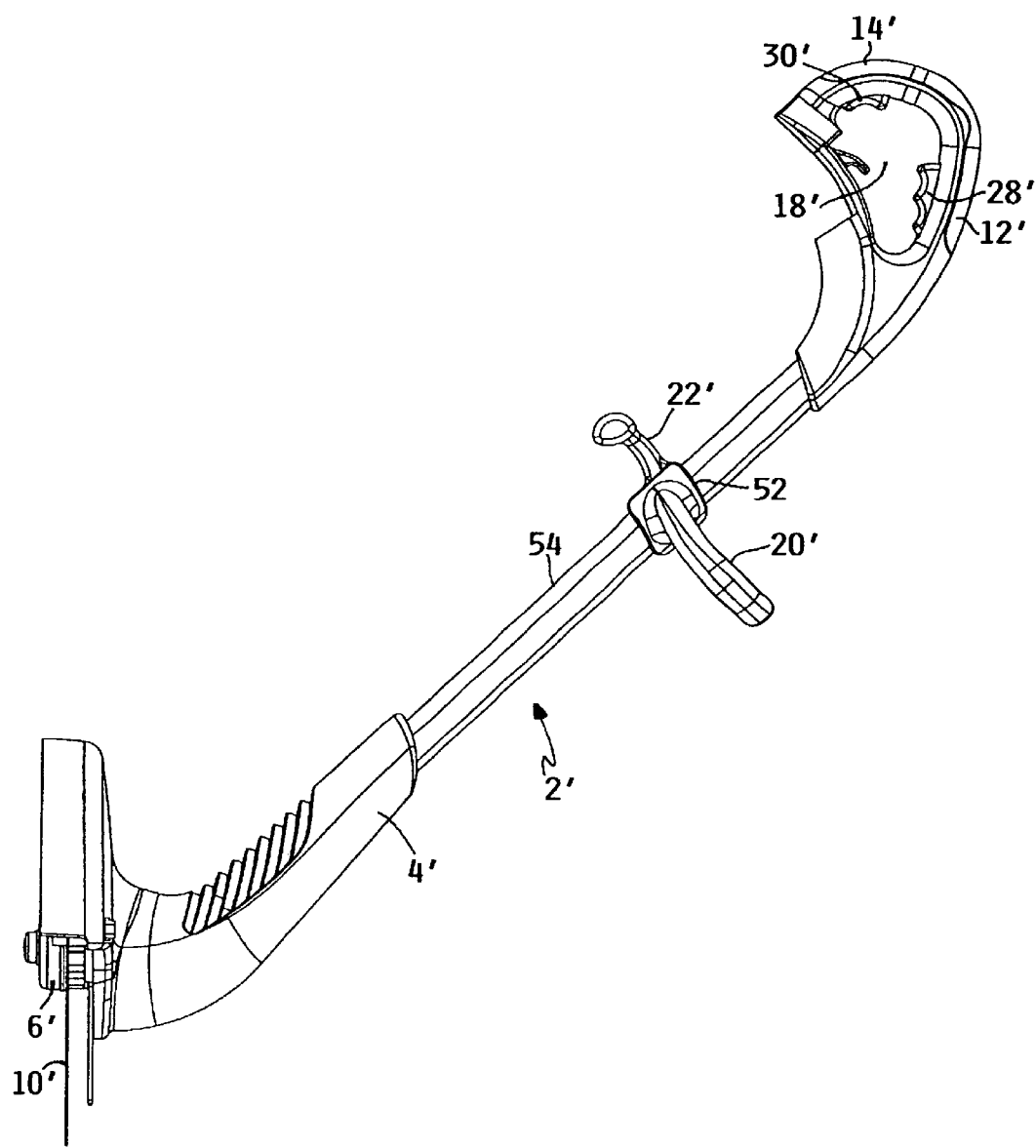
FIG. 6 is a side elevational view of the filament trimmer shown in FIG. 5, particularly illustrating the trimmer positioned in the edge mode.
Figure 7:
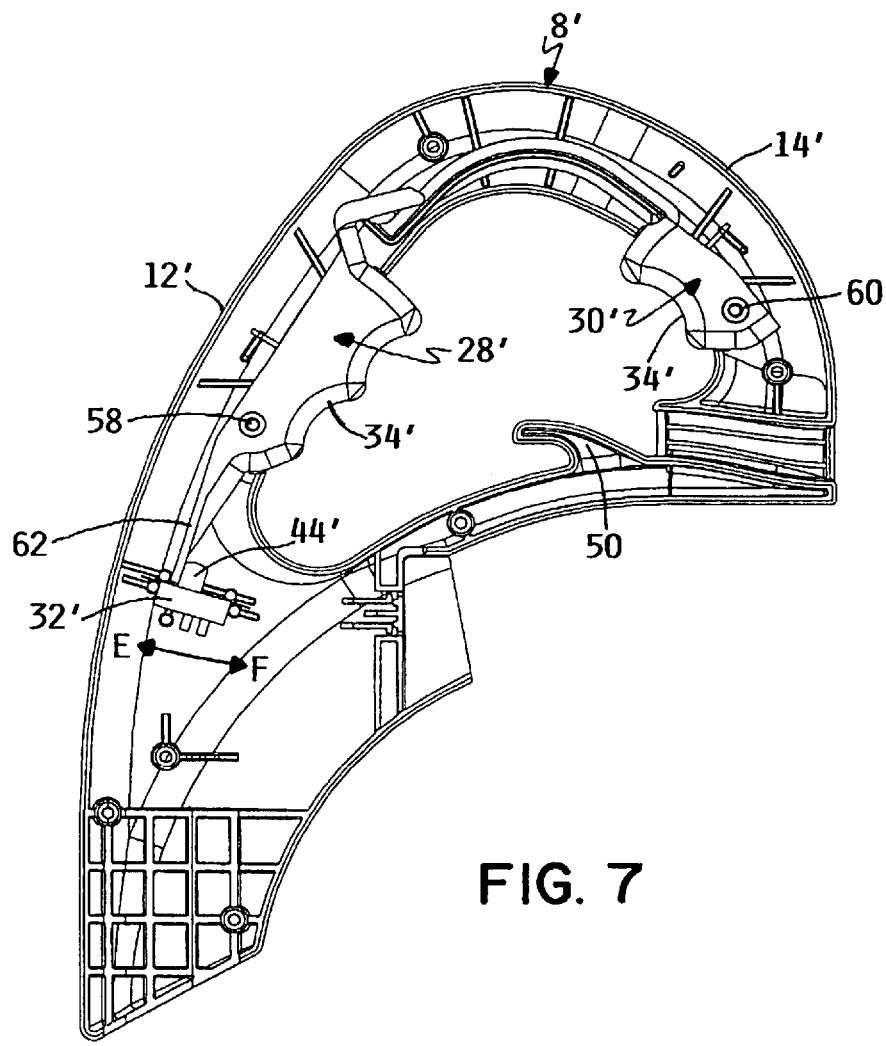
FIG. 7 is an enlarged side elevational view of the upper handle of the filament trimmer shown in FIG. 5, with a portion of the upper handle removed to illustrate the dual triggers and their interaction with an electrical slide switch for actuating the trimmer head but with both of the triggers being shown in a non-actuated state with the switch in its off state.
Figure 8:
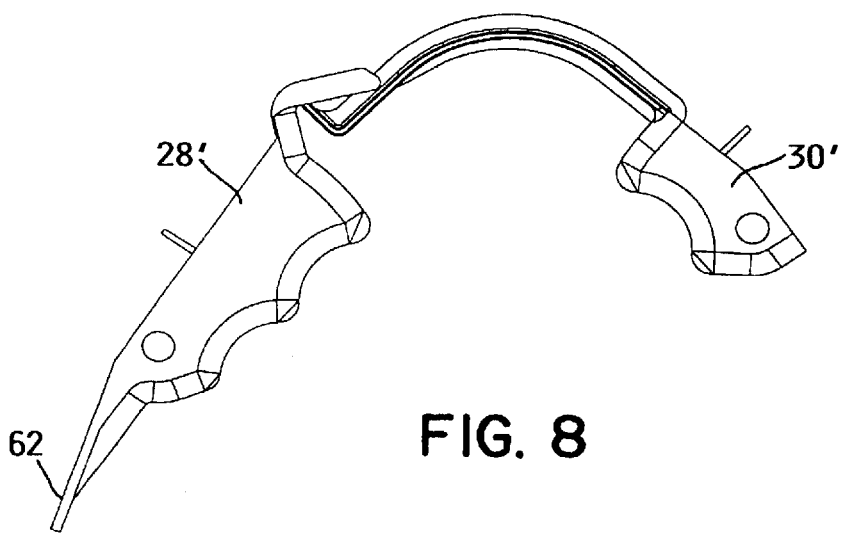
FIG. 8 is an enlarged side elevational view similar to FIG. 7, but showing only the dual triggers and the switch disposed in the same states as depicted in FIG. 7.

To actuate trimmer 2' in the edge mode, the operator first flips trimmer 2' over and reorients it as shown in FIG. 5. The operator then grips rear hand grip 14' and rear 24 assist handle 22' and squeezes rear trigger 30' closed against the underside of rear hand grip 14'. This causes rear trigger 30' to rotate oppositely to front trigger 28', as shown by the arrows H in FIGS. 11 and 12. Moreover, rear trigger 30 is not located proximately to electrical switch 32' and is not in direct engagement with electrical switch 32'.

However, rear trigger 30' includes a curved, elongated cam finger 64 extending inside housing 4'. Cam finger 64 engages against the underside of a rear surface 66 on front trigger 28'. Thus, rotation of rear trigger 30' in the direction of arrow H causes cam finger 64 to lift up on rear surface 66 of front trigger 28' to rotate front trigger 28 in the usual switch actuating direction G of front trigger 28'. Thus, electrical switch 32' is actuated by rear trigger 30' to operate trimmer 2' in the edge mode, with front trigger 28' serving in this instance as a bridge or connection between rear trigger 30' and actuating button 44' of electrical switch 32'. This allows the use of a single conveniently located electrical switch 32', which can be operated by both triggers 28' and 30' even though such triggers rotate about separate pivot pins 58 and 60 and even though one trigger 30' is located remotely from switch 32'.

Both trimmers 2, 2' disclosed herein use dual triggers 28 and 30, 28' and 30' to actuate a single electrical switch 32, 32'. Using a single electrical switch avoids the expense of more than one switch. However, dual electrical switches could also obviously be used to control the application of electrical power to the motor that rotates trimmer head 6, 6', one switch being proximately located to front trigger 28, 28' and another switch being proximately located to rear trigger 30, 30'.

Moreover, while an electrical motor controlled by an electrical switch has been described as comprising the drive for rotating trimmer head 6, 6', a mechanical drive could be used in place of the electrical drive. Thus, trimmer 2, 2' could be equipped with an internal combustion engine powering a drive shaft operatively connected to trimmer head 6, 6'. The drive shaft could be selectively powered through a mechanical switch, such as a clutch or other selectively actuable, mechanical power coupler. In such a case, the dual triggers when actuated would be linked to the clutch to actuate the clutch to selectively place trimmer head 6, 6' in operation.

Various other modifications will be apparent to those skilled in the art. Thus, this invention shall be limited only by the appended claims.

We claim:

1. A filament trimmer, which comprises:
   a) a rotatable trimmer head having an outwardly extending filament;
   b) an upper handle which the operator can grip to position the trimmer head adjacent the ground and to operate the trimmer in either a trim mode or an edge mode, wherein the filament is positioned in a generally horizontal cutting plane in the trim mode and in a generally vertical cutting plane in the edge mode; and
   c) dual triggers on the upper handle for selectively starting and stopping rotation of the trimmer head, wherein one trigger is actuated to operate the trimmer in the trim mode and the other trigger is actuated to operate the trimmer in the edge mode, wherein the dual triggers are part of a single, integrated trigger assembly that is pivotally mounted on the handle for pivoting about a single pivot axis.

2. A filament trimmer, which comprises:
   a) a housing;
   b) a rotatable trimmer head on the housing with the trimmer head having a filament extending outwardly therefrom;
   c) a drive on the housing for rotating the trimmer head, the drive including a switch having an off state in which the trimmer head is not driven by the drive and an on state in which the trimmer head is driven by the drive;
   d) a handle on the housing, wherein the handle includes a front hand grip and a rear hand grip, wherein the front and rear hand grips are gripped by the operator when the trimmer is operated in a trim mode and an edge mode, respectively;
   e) a front assist handle on the housing, wherein the trimmer is operated in the trim mode when the operator grips the front hand grip of the handle with one hand and the front assist handle with the operator's other hand with the housing of the trimmer oriented such that the filament is rotated in a substantially horizontal cutting plane when the trimmer head is rotated;
   f) a rear assist handle on the housing, wherein the trimmer is operated in the edge mode when the operator grips the rear hand grip of the handle with one hand and the rear assist handle with the operator's other hand with the housing oriented such that the filament is rotated in a substantially vertical cutting plane when the trimmer head is rotated; and
   g) dual triggers on the handle for allowing the operator to selectively place the switch in the on state to cause the trimmer head to be rotated by the drive system, wherein the dual triggers comprise a front trigger on the front hand grip and a rear trigger on the rear hand grip.

3. The filament trimmer of claim 2, wherein the switch comprises an electrical switch.

4. The filament trimmer of claim 3, wherein the switch comprises a single electrical switch actuated by the front and rear triggers.

5. The filament trimmer of claim 2, wherein each trigger includes a lower portion that sticks out through an underside of the hand grip carries the trigger, wherein each trigger is actuated by squeezing the lower portion of the trigger closed against the underside of the hand grip that carries the trigger.

6. The filament trimmer of claim 5, wherein each trigger includes an upper portion that sticks out through a top of the hand grip that carries the trigger, and wherein each trigger is actuated by squeezing the lower portion of the trigger closed after first sliding the upper portion of the trigger along the top of the hand grip that carries the trigger.

7. The filament trimmer of claim 2, wherein the handle includes a hand grip space underlying the front and rear hand grips.

8. The filament trimmer of claim 7, wherein at least a portion of the front and rear triggers are received in the hand grip space.

9. The filament trimmer of claim 2, wherein the front and rear triggers are part of a single, integrated trigger assembly pivotal about a single pivot axis.

10. The filament trimmer of claim 9, wherein the trigger assembly is shaped relative to the pivot axis such that actuation of the front and rear triggers causes rotation of the trigger assembly about the pivot axis in opposite directions.

11. The filament trimmer of claim 10, wherein the trigger assembly includes a notch for receiving an actuating button of a push button switch, the notch being shaped to push in on the actuating button of the push button switch regardless of the direction of rotation of the integrated trigger assembly such that the push button switch is placed in the on state when either the front or the rear trigger is actuated.

12. The filament trimmer of claim 2, wherein the front and rear triggers comprise separate triggers pivotal about a front pivot axis and a rear pivot axis, respectively.

13. The filament trimmer of claim 12, wherein the switch includes a slide switch having a slidable actuating button, and wherein the front trigger is located proximately to the slide switch with an actuating finger of the front trigger in engagement with the slidable actuating button such that pivoting of the front trigger in a first direction about the front pivot axis slides the actuating button such that the slide switch is placed in the on state.

14. The filament trimmer of claim 13, wherein the rear trigger is not in direct contact with the slide switch but has a cam finger in contact with the front trigger, wherein pivoting of the rear trigger in a second direction opposed to the first direction causes the cam finger to act on the front trigger to pivot the front trigger in the first direction to thereby place the slide switch in the on state.

15. The filament trimmer of claim 12, wherein the separate front and rear triggers are arranged to actuate a single switch.

16. The filament trimmer of claim 15, wherein one of the triggers directly contacts the switch to actuate the switch when the one trigger is pivoted, and wherein the other trigger does not directly contact the switch to actuate the switch but actuates the switch when the other trigger is rotated by pivoting the one trigger to actuate the switch through the one trigger.

17. The filament trimmer of claim 16, wherein the switch is an electrical slide switch.

18. The filament trimmer of claim 2, wherein the front and rear assist handles are attached to the housing at different locations.

19. The filament trimmer of claim 2, wherein the front and rear assist handles are attached to the housing by a common mounting hub.

20. A filament trimmer, which comprises:
  a) a rotatable trimmer head having an outwardly extending filament;
  b) an upper handle which the operator can grip to position the trimmer head adjacent the ground and to operate the trimmer in either a trim mode or an edge mode, wherein the filament is positioned in a generally horizontal cutting plane in the trim mode and in a generally vertical cutting plane in the edge mode; and
  c) dual triggers on the upper handle for selectively starting and stopping rotation of the trimmer head, wherein one trigger is actuated to operate the trimmer in the trim mode and the other trigger is actuated to operate the trimmer in the edge mode, wherein the dual triggers operate a single switch for selectively starting and stopping rotation of the trimmer head.

* * * * *

UNITED STATES PATENT AND TRADEMARK OFFICE
CERTIFICATE OF CORRECTION

| | |
|---|---|
| PATENT NO. | : 6,973,728 B2 |
| APPLICATION NO. | : 10/116738 |
| DATED | : December 13, 2005 |
| INVENTOR(S) | : Bart T. Ellson et al. |

It is certified that error appears in the above-identified patent and that said Letters Patent is hereby corrected as shown below:

Add the Following Claims:

Col. 10 Lines 32-45

Claim 21. A filament trimmer, which comprises:
    a) a rotatable trimmer head having an outwardly extending filament;
    b) an upper handle which the operator can grip to position the trimmer head adjacent the ground and to operate the trimmer in either a trim mode or an edge mode, wherein the filament is positioned in a generally horizontal cutting plane in the trim mode and in a generally vertical cutting plane in the edge mode; and
    c) wherein the upper handle has an outer periphery comprising an arch with one side of the arch forming a first curved hand grip and an opposite side of the arch forming a second curved hand grip, wherein the user grips the first hand grip when the trimmer is in the trim mode, and wherein the user grips the second hand grip after the trimmer is flipped over and the trimmer is in the edge mode; and further including a first trigger carried on the first hand grip for selectively starting and stopping rotation of the trimmer head when the trimmer head is in the trim mode, and a second trigger carried on the second hand grip for selectively starting and stopping rotation of the trimmer head when the trimmer head is in the edge mode..

Claim 22. The filament trimmer of claim 21, wherein the arch is non-symmetrical such that the first hand and second hand grips do not have identical curves.

Claim 23. The filament trimmer of claim 21, wherein the arch has a substantially completely open interior between the first and second hand grips.

Claim 24. The filament trimmer of claim 21, wherein the first and second triggers are each carried on an inner side of the first and second hand grips, respectively.

UNITED STATES PATENT AND TRADEMARK OFFICE
CERTIFICATE OF CORRECTION

| | | |
|---|---|---|
| PATENT NO. | : 6,973,728 B2 | Page 2 of 2 |
| APPLICATION NO. | : 10/116738 | |
| DATED | : December 13, 2005 | |
| INVENTOR(S) | : Bart T. Ellson et al. | |

It is certified that error appears in the above-identified patent and that said Letters Patent is hereby corrected as shown below:

Claim 25.  The filament trimmer of claim 24, wherein each of the first and second hand grips have a trigger release that slides on an outer side of the first and second hand grips, respectively, wherein the trigger release on a hand grip must be slid by the user to a trigger release position before the trigger on the hand grip can be actuated by the user.

Signed and Sealed this

Fifth Day of February, 2008

JON W. DUDAS
*Director of the United States Patent and Trademark Office*